(12) United States Patent
Sudhakaran et al.

(10) Patent No.: US 10,979,176 B1
(45) Date of Patent: Apr. 13, 2021

(54) CODEBOOK TO REDUCE ERROR GROWTH ARISING FROM CHANNEL ERRORS

(71) Applicant: NVIDIA Corp., Santa Clara, CA (US)

(72) Inventors: Sunil Sudhakaran, Brisbane, CA (US); Rohit Rathi, Milpitas, CA (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/792,154

(22) Filed: Feb. 14, 2020

(51) Int. Cl.
*H04L 1/00* (2006.01)
*H04L 1/08* (2006.01)
*H04L 25/03* (2006.01)

(52) U.S. Cl.
CPC .......... *H04L 1/0042* (2013.01); *H04L 1/0061* (2013.01); *H04L 1/08* (2013.01); *H04L 25/03343* (2013.01)

(58) Field of Classification Search
CPC ....... H04L 1/0042; H04L 1/08; H04L 1/0061; H04L 25/03343
See application file for complete search history.

(56) References Cited

U.S. PATENT DOCUMENTS

| | | | |
|---|---|---|---|
| 6,717,990 B1* | 4/2004 | Abousleman | H03M 7/30 341/200 |
| 2004/0153318 A1* | 8/2004 | Chamberlain | G10L 19/038 704/222 |
| 2017/0272285 A1* | 9/2017 | Shokrollahi | H04L 25/0276 |

* cited by examiner

*Primary Examiner* — Vineeta S Panwalkar
(74) *Attorney, Agent, or Firm* — Rowan TELS LLC

(57) ABSTRACT

Techniques for limiting the growth of errors in decoded data words that arise from bit errors incurred during transmission. The growth of 3+ bit errors in the decoded data word is limited at the expense of a higher number of two bit errors, which are correctable using practical error correcting codes.

19 Claims, 15 Drawing Sheets

FIG. 3

| ERROR BITS IN DECODED DATA WORD | COUNT |
|---|---|
| 1 | 378 |
| 2 | 312 |
| 3 | 0 |
| 4 | 0 |
| TOTAL | 690 |

FIG. 4

| ERROR BITS IN DECODED DATA WORD | COUNT |
|---|---|
| 2 | 1014 |
| 3 | 496 |
| 4 | 112 |
| 5 | 16 |
| 6 | 0 |
| TOTAL | 1638 |

CODEBOOK TO REDUCE ERROR GROWTH ARISING FROM CHANNEL ERRORS

BACKGROUND

Four level and N-level Pulse Amplitude Modulation (PAM-4, PAM-N respectively) encoders are candidates for use with graphic memory interfaces as a way to improve communication bandwidth. Due to its use of multilevel symbol values, PAM-4/N is more susceptible to noise introduced from intersymbol interference (ISI) and crosstalk.

In telecommunication, ISI is a form of distortion of a signal in which one symbol interferes with subsequent symbols. This is an unwanted phenomenon as the previous symbols have similar effect as noise, thus making the communication less reliable.

Crosstalk is any phenomenon by which a signal transmitted on one circuit or channel of a transmission system creates an undesired effect in another circuit or channel. Crosstalk is usually caused by undesired capacitive, inductive, or conductive coupling from one circuit or channel to another.

Encoding schemes such as Maximum Transition Avoidance (MTA) may reduce the effects of ISI and crosstalk in PAM-4/N systems. One problem that may occur when using encoding schemes is the growth of bit errors in the decoded data word, due to bit failures (also called bit flips) in the transmitted codeword. Bit flips in the codeword during transmission may expand out the output of the decoder into an unrecoverable number of bit errors, thus reducing throughput or introducing unreliability.

BRIEF SUMMARY

Disclosed herein are encoding techniques for reducing the growth effects of bit failures in transmission channels utilizing PAM-4, and more generally PAM-N. The encoding techniques may be utilized post-CRC (cyclic redundancy check) generation on the data words to transmit.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 depicts an encoding table 302 in accordance with one embodiment.

FIG. 4 depicts data word bit error results 400 for single bit failures in codewords of the encoding table 302.

FIG. 5 depicts data word bit error results 500 for double bit failures in codewords of the encoding table 302.

DETAILED DESCRIPTION

Figure 1:
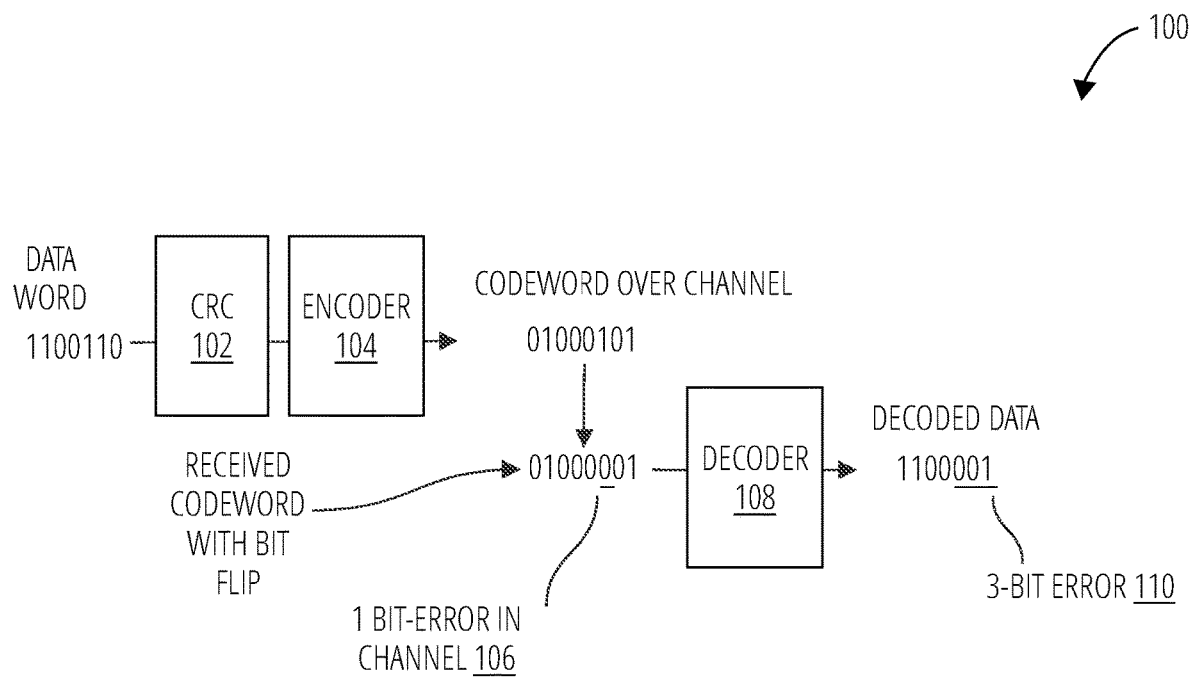
FIG. 1 depicts bit error expansion 100 in data words arising from bit flips in codewords.

Exemplary techniques are described for generating a codebook for digital transmissions by assigning codewords to data words, whereby each codeword that is assigned has a Hamming Distance (HD) of one (1) with respect to a data word to which the codeword is assigned, and the data word to which the codeword is assigned has a Hamming Distance less than or equal to two (2) with respect to data words already having codewords assigned.

The codebook may be utilized to encode the data words into the codewords after a cyclic redundancy check (CRC) value is computed on the data words, for example in system layouts in which a CRC generator is utilized prior to the encoder in a data flow from a digital component to a data bus.

The techniques involve forming a first set of the data words satisfying $HD(x,y) \leq 2$ for an unassigned codeword, sorting the first set of data words such that data words satisfying $HD(x,y)=1$ have a higher priority for assignment of a codeword than others that do not satisfy this constraint, forming a second set of data words satisfying $HD(x) \leq 2$ with respect to one another, and determining an intersection set of the first set of data words and the second set of data words.

An unassigned codeword from the intersection set that satisfies $HD(y)=1$ for data words in the intersection set is then selected, subject to a constraint that a data word to assign to the codeword satisfies $HD(x) \leq 2$ with respect to data words that are already assigned to codewords.

A codebook generated in this manner may be inverted to generate a second or expanded codebook.

The decoder that receives the codewords may determine if an inversion of a most significant bit (MSB) of a transmitted codeword has occurred, and on condition that the MSB inversion has occurred, initiate a retransmission of the transmitted codeword. Determining if the MSB inversion occurred may involve comparing a CRC for the transmitted data word generated before transmission with a CRC for the transmitted data word generated after decoding.

A system utilizing such codebooks may include a first digital component and a second digital component coupled to the first digital component via the data bus, and an encoder utilizing a first codebook generated by assigning codewords to data words communicated between the first digital component and the second digital component over the bus, each codeword that is assigned having a Hamming Distance of one with respect to an assigned data word for the codeword, wherein each of the data words has a Hamming Distance less than or equal to two relative to other data words to which codewords are assigned. The encoder may be disposed in the circuit layout of the system between a CRC generator and the bus, such that the codebook is utilized by the encoder to encode the data words into the codewords after a cyclic redundancy check value is computed on the data words by the CRC generator. By way of example, the first digital component and the second digital component, or vice versa, may be a memory and a processor, two processors, or two memories.

FIG. 1 depicts bit error expansion 100 when a CRC generator 102 produces a cyclic redundancy check value on the raw data (the data word) which is then transformed by an encoder 104 into a codeword. During transmission over the communication channel, one of the bits (underlined) of the codeword is flipped from a 1 to a 0. This is referred to as a codeword bit flip 106. Bit flipping can happen due to noise on the communication channel and other reasons. Because the codeword was changed by one bit during transmission, and the CRC was generated on the unencoded data word, the codeword is decoded by a decoder 108 into a data word that the CRC calculation indicates has three bits flipped, not one bit. In this example, the last three bits are indicated as being flipped, a so-called 3-bit error 110. Common error correction techniques (e.g., error correcting codes appended to the raw data) can correct 1-bit and 2-bit flips, but not three bit flips (unless very complicated codes are used). In this case, even though a single bit was flipped in the codeword, the entire data word is typically retransmitted, which is inefficient especially because 1-bit errors in the communication channel can be fairly common in noisy environments.

Figure 2:
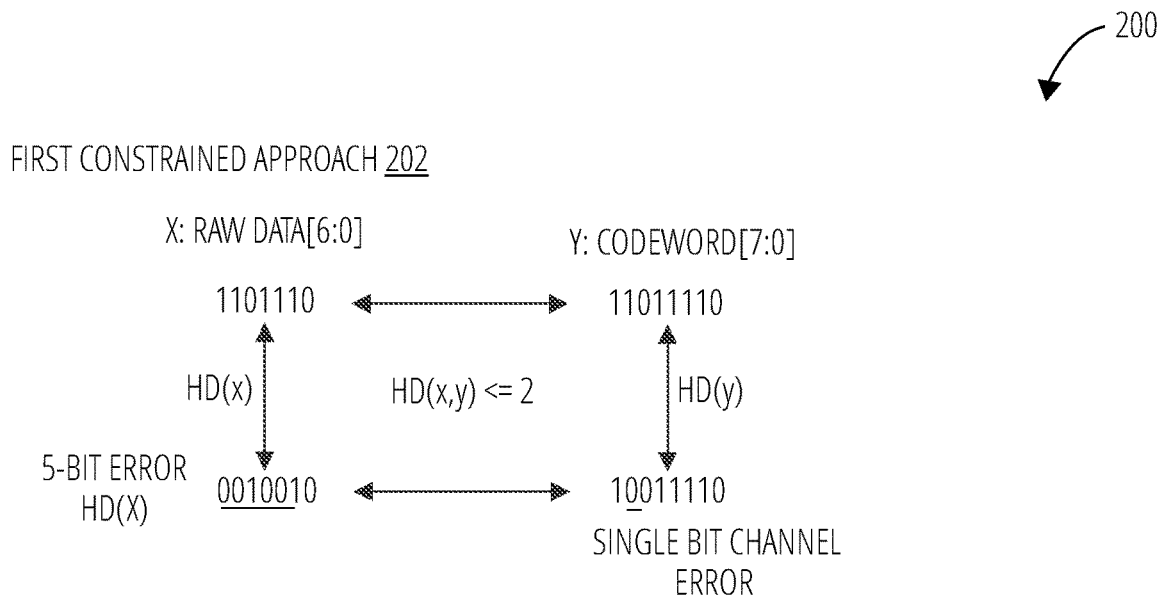
FIG. 2 depicts possible encoding constraints 200 that may be applied to reduce bit error expansion.
Figure 2:
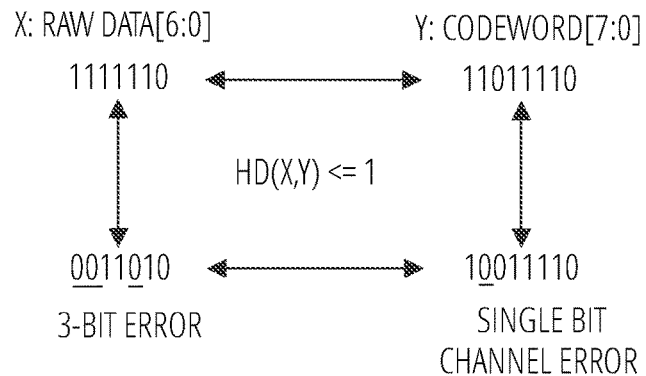

Referring to FIG. 2, encoding constraints 200 may be implemented to address the bit-flipping problem. In the first constrained approach 202, the mapping of raw data to codewords is constrained such that a codeword for a data word never differs from the data word by more than two bits (HD(x,y)<=2 where HD refers to the Hamming Distance metric). However, a one-bit flip during transmission of the code word could still cause up to 5-bit errors. In the second constrained approach 204, the encoding is constrained such that the code word never differs by more than 1-bit from the corresponding data word (HD(x,y)<=1). Unfortunately a one-bit flip of the code word during transmission may still cause 3-bit errors even using this heavily constrained approach.

Figure 3:
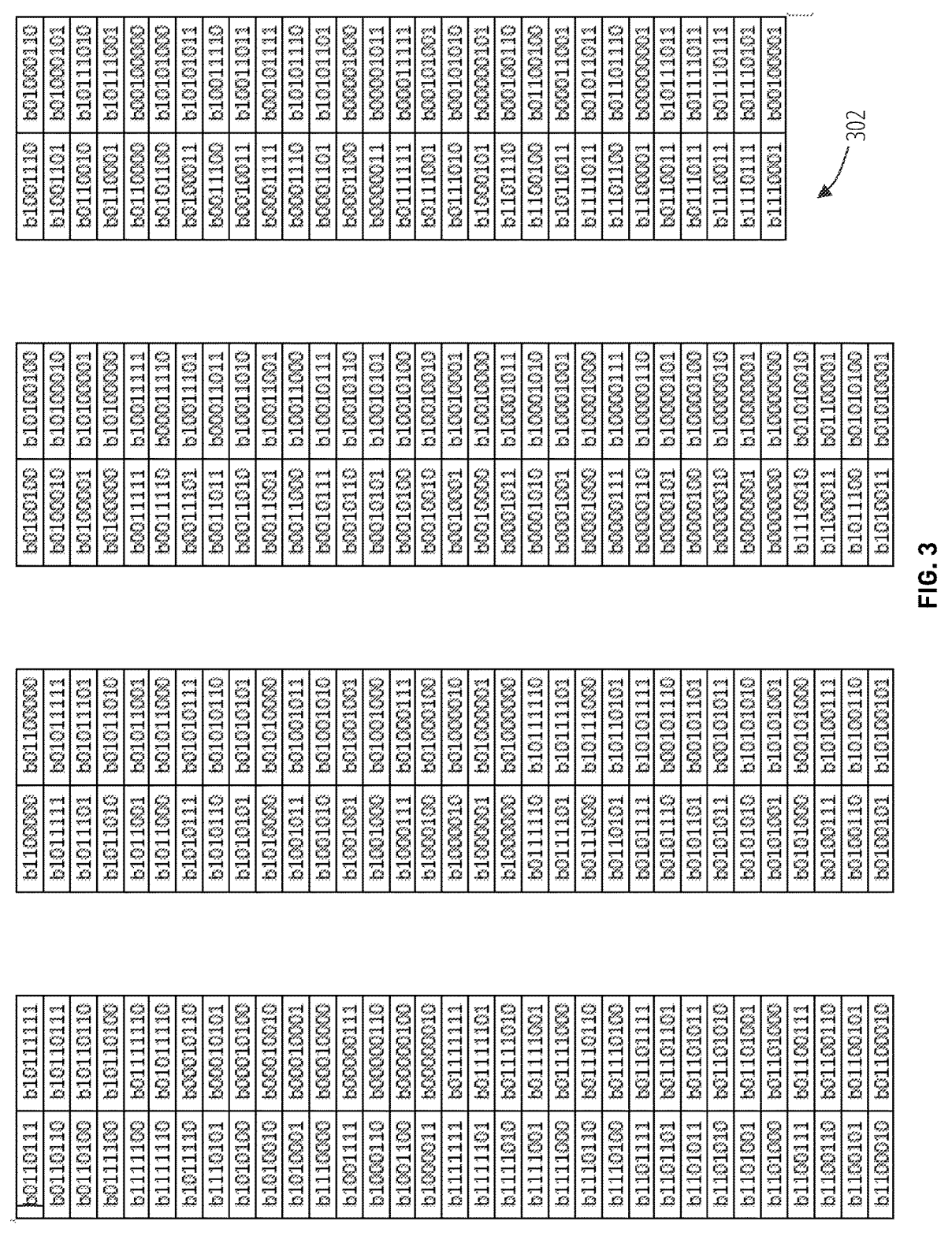

FIG. 3 depicts an encoding table 302 for an improved MTA encoder that mitigates bit error expansion. The encoding table 302 may be utilized with MTA PAM-4 encoders wherein each group of four symbols (½ burst) encodes seven bits of the data words as an eight bit codeword (four PAM-4 symbols) on the data lanes, and one bit of the data word on a control lane, of a serial data bus. The bits on the control lane are also communicated as PAM-4 symbols. There are $2^7=128$ combinations of seven bits, and therefore 128 codewords in the encoding table 302 for use with each ½ burst of data on each of the data lanes. The codewords in the encoding table 302 are selected from a set that avoids maximum voltage transitions between symbols on the data lanes.

FIG. 4 depicts data word bit error results 400 for a single bit flip in the codewords of the encoding table 302. For single bit flip errors (which are the most common type) in the codewords, the encoding table 302 results in 378 1-bit decoded data word errors, 312 2-bit decoded data word errors, 0 3-bit errors, and 0 4-bit errors, for a total of 690 possible data word errors, which are correctable. Thus for single bit codeword failures, the encoding table 302 results in only 1-bit or 2-bit errors in the decoded raw data at the receiver, and no higher-order bit failures. These 1-bit and 2-bit errors may be corrected with EDC/ECC (error detecting codes and error correcting codes). Therefore, there may be fewer retransmissions of the raw data using the second approach.

FIG. 5 depicts data word bit error results 500 for a double bit flip in the codewords of the encoding table 302. The encoding table 302 results in 1014 2-bit errors, 496 3-bit errors, 112 4-bit errors, 16 5-bit errors, and 0 6-bit errors for a total of 1638 possible errors in the decoded data word. Error growth overall is thus reduced using the encoding table 302, for example when a full-rate 0x9EB2 polynomial is used to generate the CRC (cyclic redundancy check) value.

Figure 6:
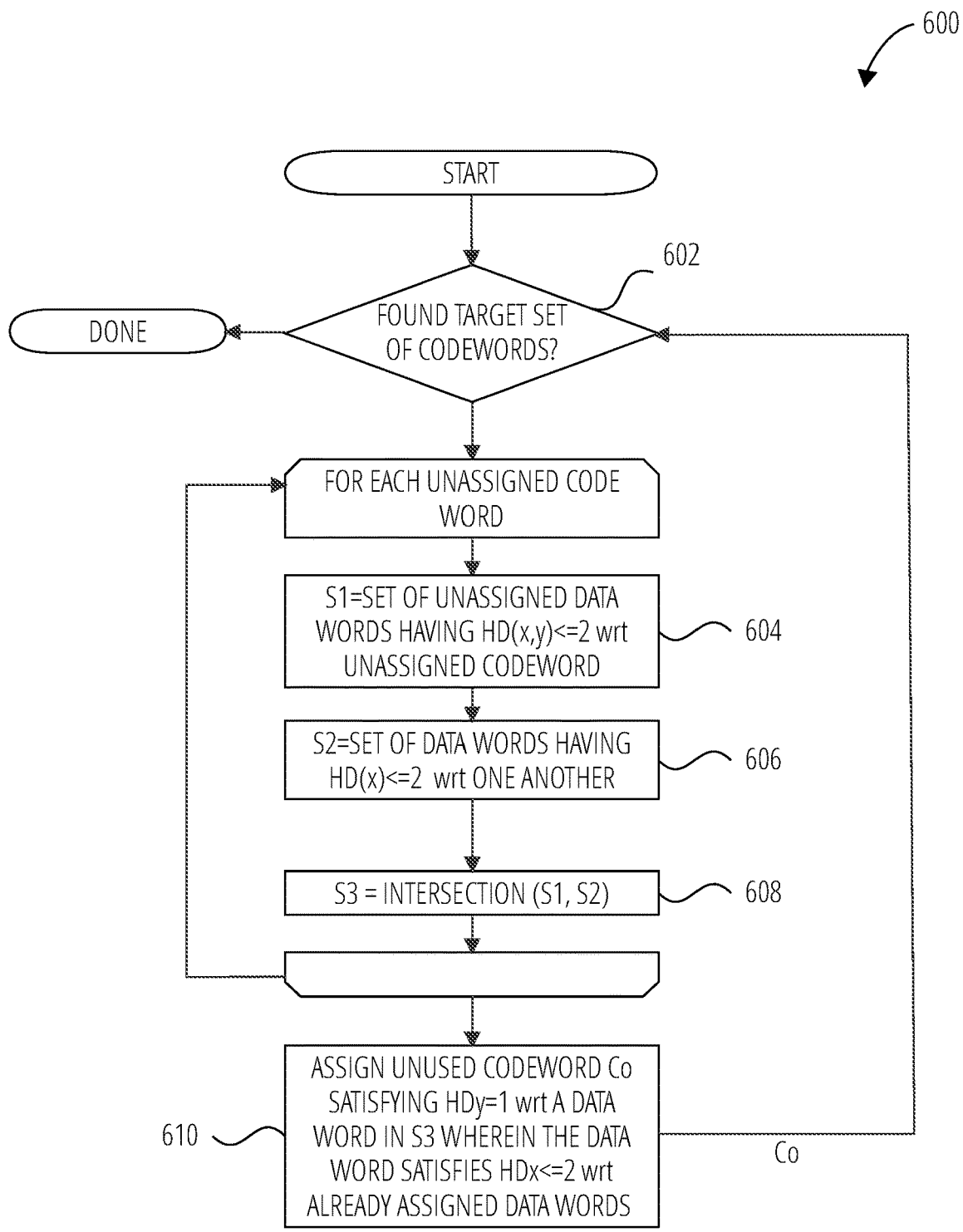
FIG. 6 depicts a codebook generation process 600 in accordance with one embodiment.

FIG. 6 depicts a codebook generation process 600 in one embodiment. The codebook generation process 600 may be utilized to generate at least a portion of the encoding table 302 and similar codebooks for encoders that limit the expansion of bit errors due to bit flips in codewords. The set of codewords generated by the codebook generation process 600 may provide a starting point for completing the codebook, using other techniques or algorithms that may depend on the particular encoder and other design factors.

The stop condition is achieved when a target number of codeword-data word pairs have been identified (decision block 602). Initially, codewords are unassigned to a corresponding data word. For each unassigned codeword, a set of data words satisfying HD(x,y)≤2 with respect to the unassigned codeword are identified from the set of remaining unassigned data words (block 604). This set of data words may be sorted or ordered such that data words satisfying HD(x,y)=1 are assigned a higher priority (this may speed up convergence of the algorithm in some cases) than data words not meeting this constraint. A second set of data words satisfying HD(x)≤2 with respect to one another is identified (block 606), and the intersection of the two sets is determined (block 608).

Once the intersection sets are identified for each unassigned codeword, these sets are scanned to determine an unassigned codeword that satisfies HD(y)=1 for the data words in the sets, with the constraint that the data word the codeword is assigned to satisfied HD(x)<=2 with respect to data words that are already assigned to codewords (block 610). The codebook generation process 600 then recurses to analyze and assign additional ones of the unassigned codewords.

Figure 7:
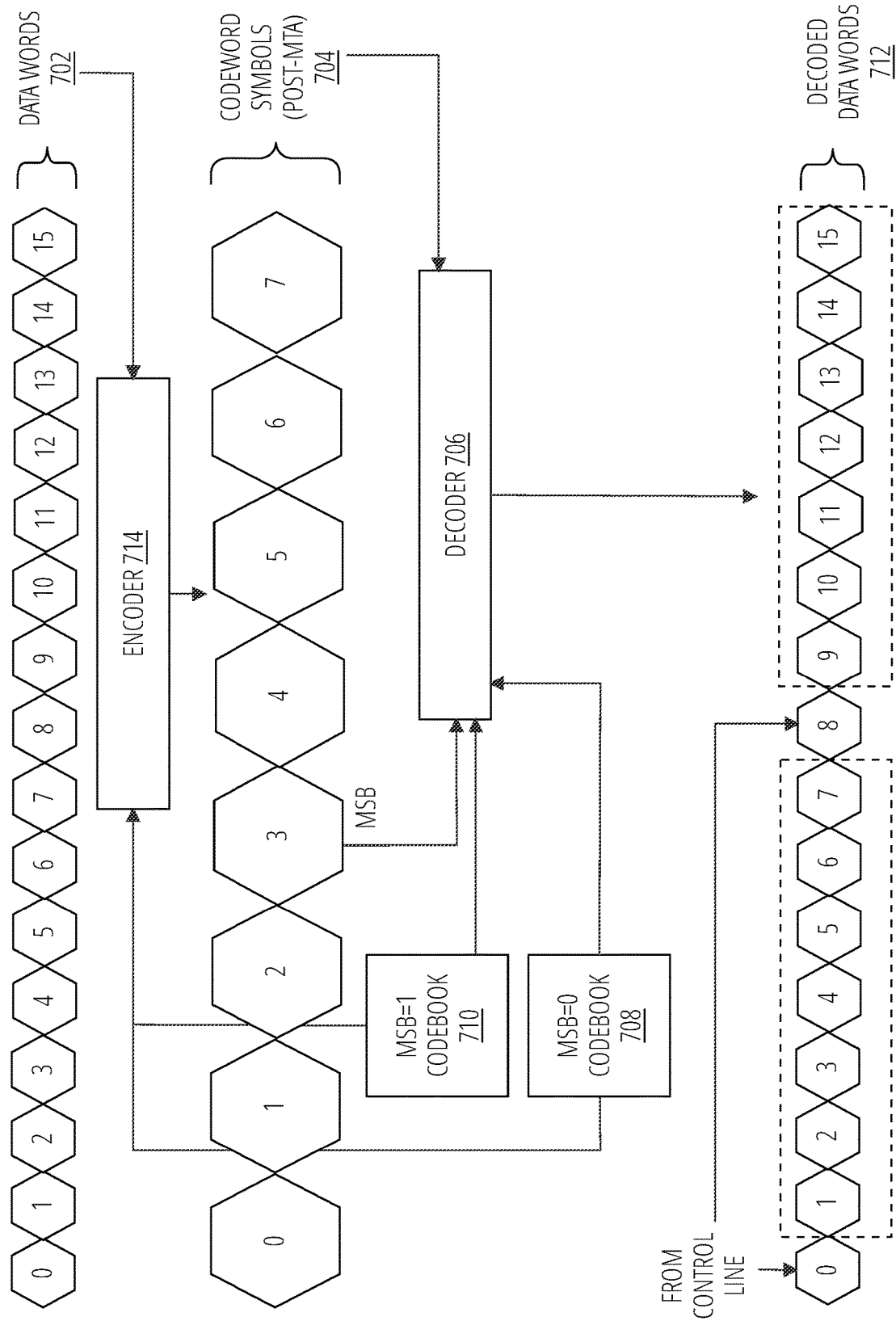
FIG. 7 depicts an embodiment of a bit failure at the MSB of the first code word of MTA encoding.

FIG. 7 depicts the use of two mapping tables (i.e., codebooks) depending on the most significant bit (MSB) of the bits for the last symbol in a ½-burst (e.g., symbol #3 in FIG. 7). The first codebook may implement the encoding table 302, and the second codebook may be an encoding table with inverted codewords from the encoding table 302. A second codebook may not be utilized in some embodiments; inverting the codeword from the encoding table 302 (e.g., passing the code word through an inverter) may suffice.

The data words 702 are encoded by the encoder 714 using one of two codebooks to generate the codeword symbols 704. The decoder 706 may utilize the most significant bit (MSB) of the last symbol in the current codeword to determine which codebook to use to decode the subsequent codeword into the decoded data words 712 (e.g., whether or not to invert a codeword from the encoding table 302). This is depicted in FIG. 7 as selecting between the MSB=0 codebook 708 and the MSB=1 codebook 710). There are two codewords per 16 bits of the data words 702. A bit failure in the MSB of the last symbol (symbol 3) of the current codeword (symbols 0-3) results in the decoder 706 utilizing the wrong codebook (e.g., improperly inverting or not inverting) the subsequent codeword (symbols 4-7).

Figure 8:
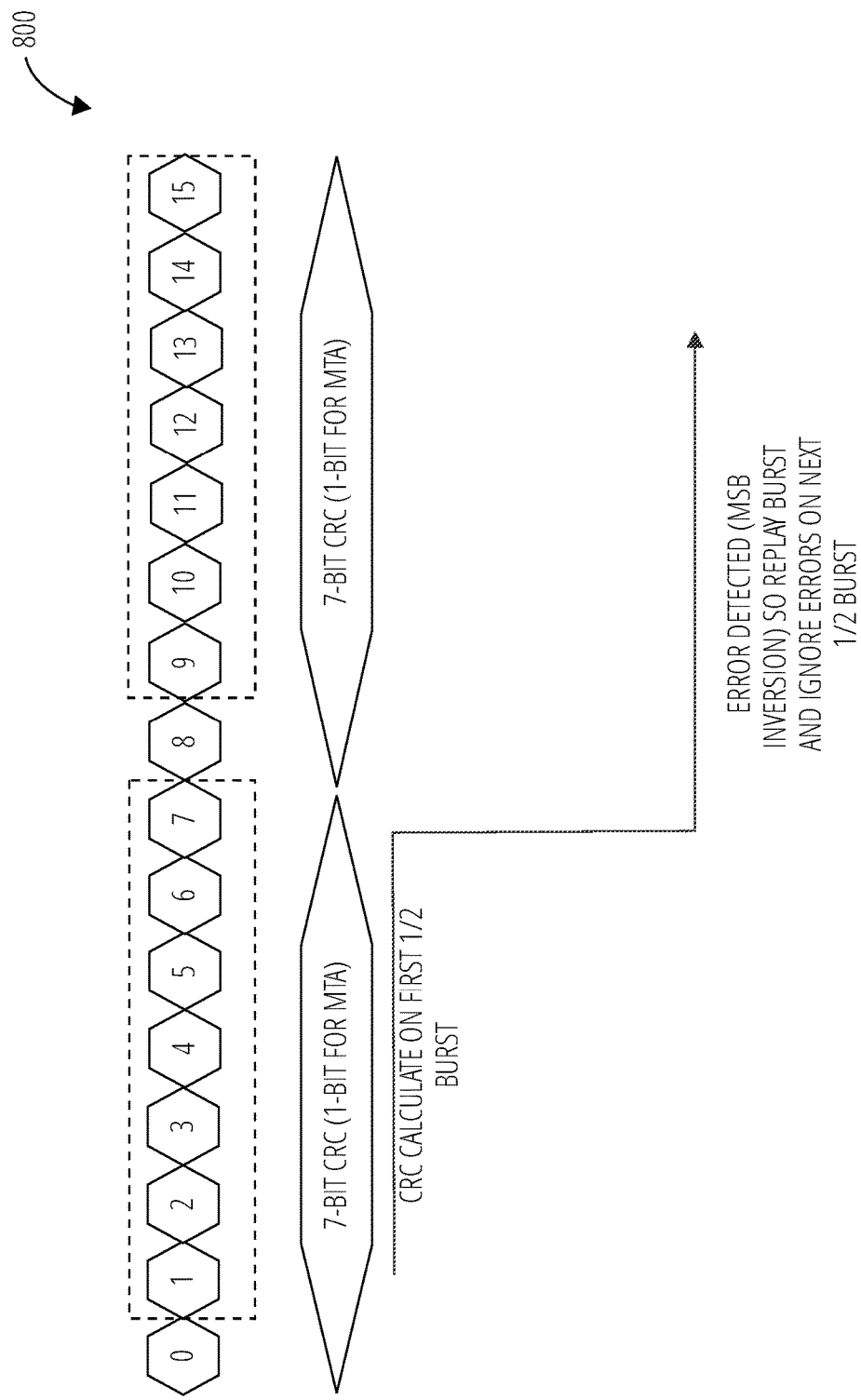
FIG. 8 depicts an embodiment of an MSB inversion detection and replay 800.

In FIG. 8 an MSB inversion detection and replay 800 is depicted. The CRC is calculated for the first ½ burst after it is received and decoded. After completing the calculation, whether an MSB inversion has occurred is determined by comparing the calculated CRC with the received CRC for the ½ burst. If an MSB inversion occurred, the subsequent ½ burst is not decoded, and the entire burst is replayed.

Embodiments of the algorithms and techniques disclosed herein may be executed by computing devices utilizing one or more graphic processing unit (GPU) and/or general purpose data processor (e.g., a 'central processing unit or CPU). Exemplary architectures will now be described that may be configured to carry out the techniques disclosed herein on such devices.

Embodiments of the techniques and codebooks disclosed herein may be particularly useful in system layouts in which the encoder is disposed between a CRC generator and a data bus, such that the codebook is utilized by the encoder to encode the data words into the codewords after a cyclic redundancy check value is computed on the data words by the CRC generator. By way of example, the first digital component and the second digital component, or vice versa, may be a memory and a processor, two processors, or two memories.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 9:
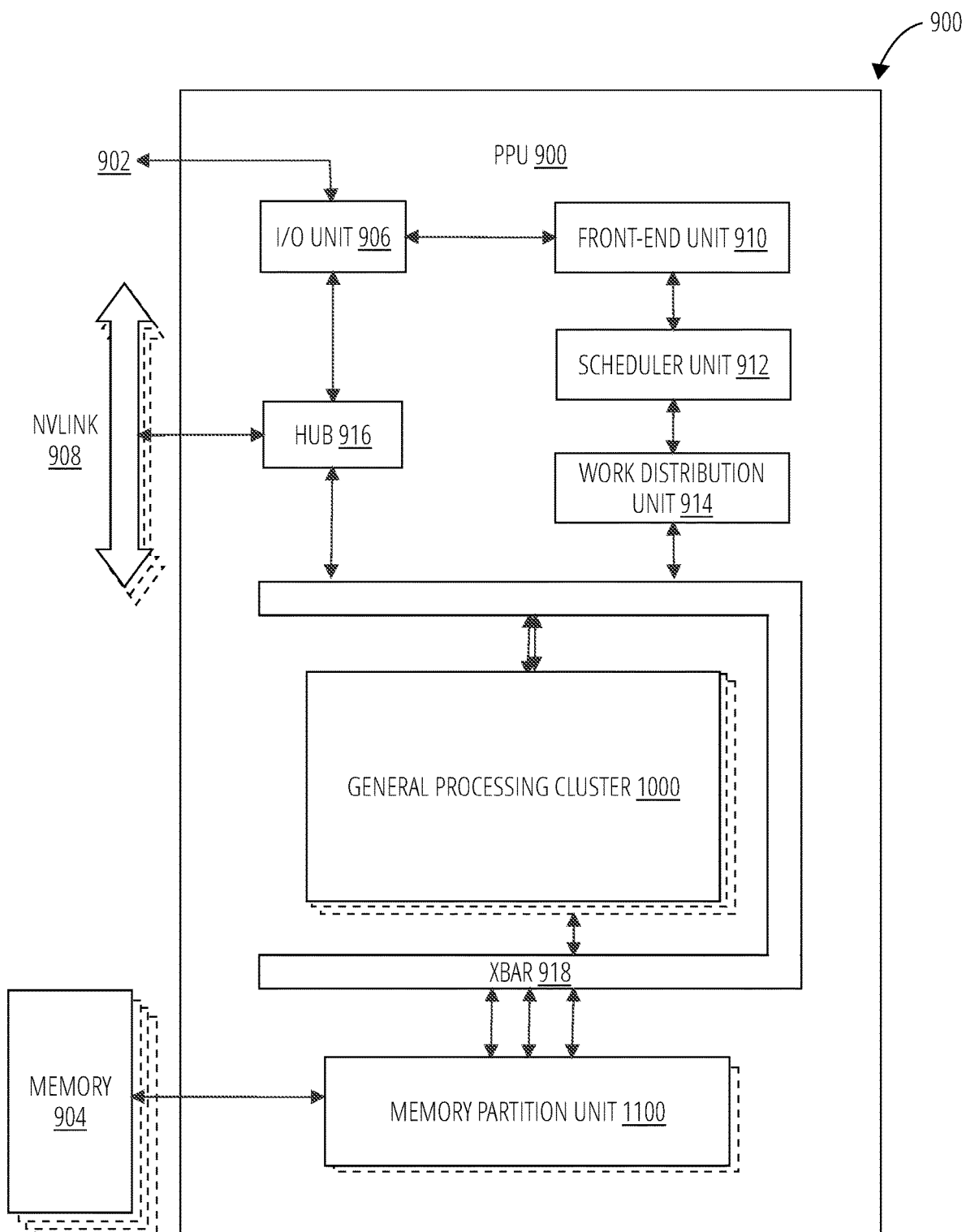
FIG. 9 depicts a parallel processing unit 900 in accordance with one embodiment.

FIG. 9 depicts a parallel processing unit 900, in accordance with an embodiment. In an embodiment, the parallel processing unit 900 is a multi-threaded processor that is implemented on one or more integrated circuit devices. The parallel processing unit 900 is a latency hiding architecture designed to process many threads in parallel. A thread (e.g., a thread of execution) is an instantiation of a set of instructions configured to be executed by the parallel processing unit 900. In an embodiment, the parallel processing unit 900 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 900 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 900 modules may be configured to accelerate thousands of High Performance Computing (HPC), data center, and machine learning applications. The parallel processing unit 900 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 9, the parallel processing unit 900 includes an I/O unit 906, a front-end unit 910, a scheduler unit 912, a work distribution unit 914, a hub 916, a crossbar 918, one or more general processing cluster 1000 modules, and one or more memory partition unit 1100 modules. The parallel processing unit 900 may be connected to a host processor or other parallel processing unit 900 modules via one or more high-speed NVLink 908 interconnects. The parallel processing unit 900 may be connected to a host processor or other peripheral devices via an interconnect 902. The parallel processing unit 900 may also be connected to a local memory comprising a number of memory 904 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 904 may comprise logic to configure the parallel processing unit 900 to carry out aspects of the techniques disclosed herein.

The NVLink 908 interconnect enables systems to scale and include one or more parallel processing unit 900 modules combined with one or more CPUs, supports cache coherence between the parallel processing unit 900 modules and CPUs, and CPU mastering. Data and/or commands may be transmitted by the NVLink 908 through the hub 916 to/from other units of the parallel processing unit 900 such as one or more copy engines, a video encoder, a video decoder, a power management unit, etc. (not explicitly shown). The NVLink 908 is described in more detail in conjunction with FIG. 13.

The I/O unit 906 is configured to transmit and receive communications (e.g., commands, data, etc.) from a host processor (not shown) over the interconnect 902. The I/O unit 906 may communicate with the host processor directly via the interconnect 902 or through one or more intermediate devices such as a memory bridge. In an embodiment, the I/O unit 906 may communicate with one or more other processors, such as one or more parallel processing unit 900 modules via the interconnect 902. In an embodiment, the I/O unit 906 implements a Peripheral Component Interconnect Express (PCIe) interface for communications over a PCIe bus and the interconnect 902 is a PCIe bus. In alternative embodiments, the I/O unit 906 may implement other types of well-known interfaces for communicating with external devices.

The I/O unit 906 decodes packets received via the interconnect 902. In an embodiment, the packets represent commands configured to cause the parallel processing unit 900 to perform various operations. The I/O unit 906 transmits the decoded commands to various other units of the parallel processing unit 900 as the commands may specify. For example, some commands may be transmitted to the front-end unit 910. Other commands may be transmitted to the hub 916 or other units of the parallel processing unit 900 such as one or more copy engines, a video encoder, a video decoder, a power management unit, etc. (not explicitly shown). In other words, the I/O unit 906 is configured to route communications between and among the various logical units of the parallel processing unit 900.

In an embodiment, a program executed by the host processor encodes a command stream in a buffer that provides workloads to the parallel processing unit 900 for processing. A workload may comprise several instructions and data to be processed by those instructions. The buffer is a region in a memory that is accessible (e.g., read/write) by both the host processor and the parallel processing unit 900. For example, the I/O unit 906 may be configured to access the buffer in a system memory connected to the interconnect 902 via memory requests transmitted over the interconnect 902. In an embodiment, the host processor writes the command stream to the buffer and then transmits a pointer to the start of the command stream to the parallel processing unit 900. The front-end unit 910 receives pointers to one or more command streams. The front-end unit 910 manages the one or more streams, reading commands from the streams and forwarding commands to the various units of the parallel processing unit 900.

The front-end unit 910 is coupled to a scheduler unit 912 that configures the various general processing cluster 1000 modules to process tasks defined by the one or more streams. The scheduler unit 912 is configured to track state information related to the various tasks managed by the scheduler unit 912. The state may indicate which general processing cluster 1000 a task is assigned to, whether the task is active or inactive, a priority level associated with the task, and so forth. The scheduler unit 912 manages the execution of a plurality of tasks on the one or more general processing cluster 1000 modules.

The scheduler unit 912 is coupled to a work distribution unit 914 that is configured to dispatch tasks for execution on the general processing cluster 1000 modules. The work distribution unit 914 may track a number of scheduled tasks received from the scheduler unit 912. In an embodiment, the work distribution unit 914 manages a pending task pool and an active task pool for each of the general processing cluster 1000 modules. The pending task pool may comprise a number of slots (e.g., 32 slots) that contain tasks assigned to be processed by a particular general processing cluster 1000. The active task pool may comprise a number of slots (e.g., 4 slots) for tasks that are actively being processed by the general processing cluster 1000 modules. As a general processing cluster 1000 finishes the execution of a task, that task is evicted from the active task pool for the general processing cluster 1000 and one of the other tasks from the pending task pool is selected and scheduled for execution on the general processing cluster 1000. If an active task has been idle on the general processing cluster 1000, such as while waiting for a data dependency to be resolved, then the active task may be evicted from the general processing cluster 1000 and returned to the pending task pool while another task in the pending task pool is selected and scheduled for execution on the general processing cluster 1000.

The work distribution unit 914 communicates with the one or more general processing cluster 1000 modules via crossbar 918. The crossbar 918 is an interconnect network that couples many of the units of the parallel processing unit 900 to other units of the parallel processing unit 900. For example, the crossbar 918 may be configured to couple the work distribution unit 914 to a particular general processing cluster 1000. Although not shown explicitly, one or more other units of the parallel processing unit 900 may also be connected to the crossbar 918 via the hub 916.

The tasks are managed by the scheduler unit 912 and dispatched to a general processing cluster 1000 by the work distribution unit 914. The general processing cluster 1000 is configured to process the task and generate results. The results may be consumed by other tasks within the general processing cluster 1000, routed to a different general processing cluster 1000 via the crossbar 918, or stored in the memory 904. The results can be written to the memory 904 via the memory partition unit 1100 modules, which implement a memory interface for reading and writing data to/from the memory 904. The results can be transmitted to another parallel processing unit 900 or CPU via the NVLink 908. In an embodiment, the parallel processing unit 900 includes a number U of memory partition unit 1100 modules that is equal to the number of separate and distinct memory 904 devices coupled to the parallel processing unit 900. A memory partition unit 1100 will be described in more detail below in conjunction with FIG. 11.

In an embodiment, a host processor executes a driver kernel that implements an application programming interface (API) that enables one or more applications executing on the host processor to schedule operations for execution on the parallel processing unit 900. In an embodiment, multiple compute applications are simultaneously executed by the parallel processing unit 900 and the parallel processing unit 900 provides isolation, quality of service (QoS), and independent address spaces for the multiple compute applications. An application may generate instructions (e.g., API calls) that cause the driver kernel to generate one or more tasks for execution by the parallel processing unit 900. The driver kernel outputs tasks to one or more streams being processed by the parallel processing unit 900. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 12.

Figure 10:
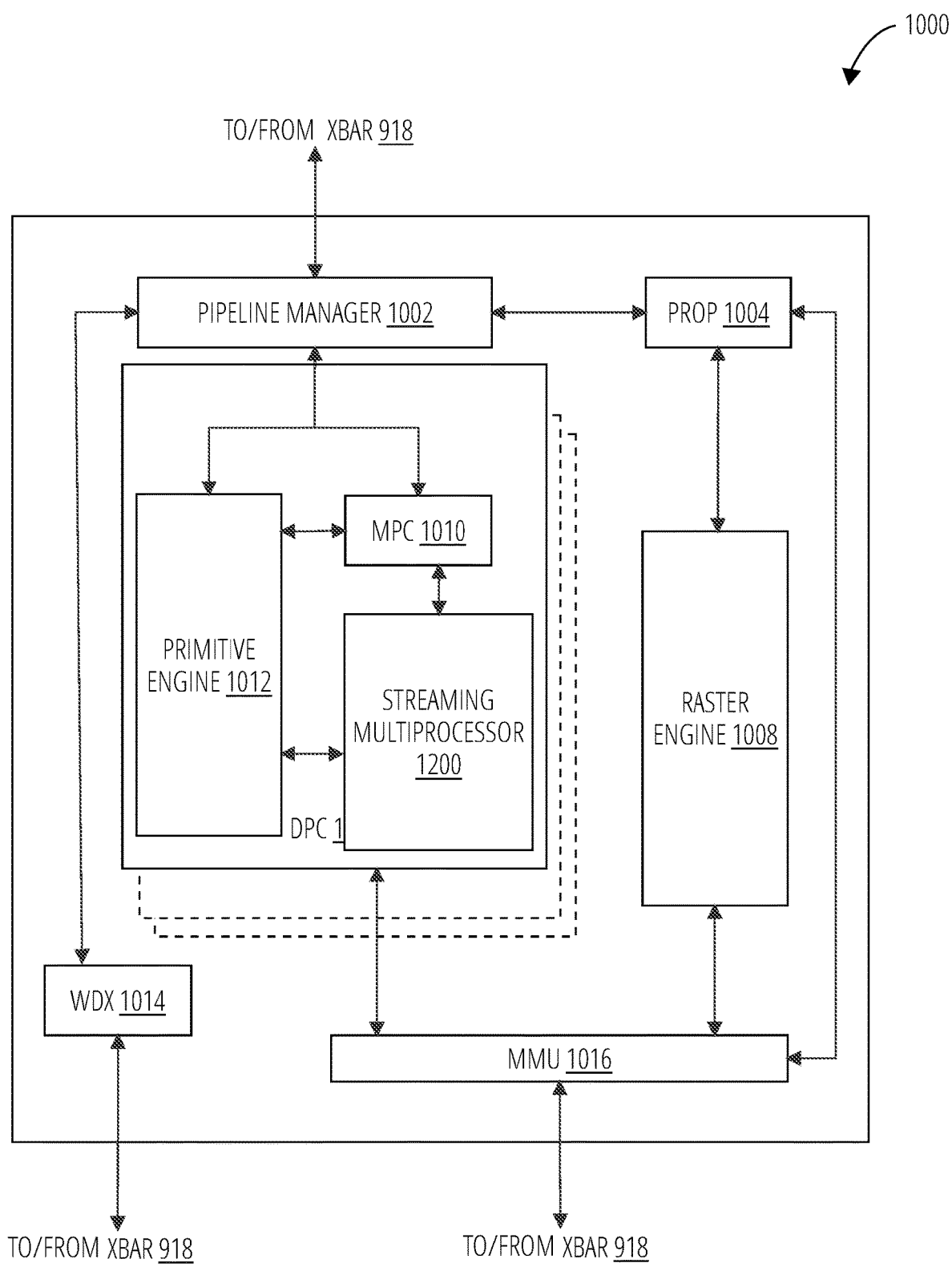
FIG. 10 depicts a general processing cluster 1000 in accordance with one embodiment.

FIG. 10 depicts a general processing cluster 1000 of the parallel processing unit 900 of FIG. 9, in accordance with an embodiment. As shown in FIG. 10, each general processing cluster 1000 includes a number of hardware units for processing tasks. In an embodiment, each general processing cluster 1000 includes a pipeline manager 1002, a pre-raster operations unit 1004, a raster engine 1008, a work distribution crossbar 1014, a memory management unit 1016, and one or more data processing cluster 1006. It will be appreciated that the general processing cluster 1000 of FIG. 10 may include other hardware units in lieu of or in addition to the units shown in FIG. 10.

In an embodiment, the operation of the general processing cluster 1000 is controlled by the pipeline manager 1002. The pipeline manager 1002 manages the configuration of the one or more data processing cluster 1006 modules for processing tasks allocated to the general processing cluster 1000. In an embodiment, the pipeline manager 1002 may configure at least one of the one or more data processing cluster 1006 modules to implement at least a portion of a graphics rendering pipeline. For example, a data processing cluster 1006 may be configured to execute a vertex shader program on the programmable streaming multiprocessor 1200. The pipeline manager 1002 may also be configured to route packets received from the work distribution unit 914 to the appropriate logical units within the general processing cluster 1000. For example, some packets may be routed to fixed function hardware units in the pre-raster operations unit 1004 and/or raster engine 1008 while other packets may be routed to the data processing cluster 1006 modules for processing by the primitive engine 1012 or the streaming multiprocessor 1200. In an embodiment, the pipeline manager 1002 may configure at least one of the one or more data processing cluster 1006 modules to implement a neural network model and/or a computing pipeline.

Figure 11:
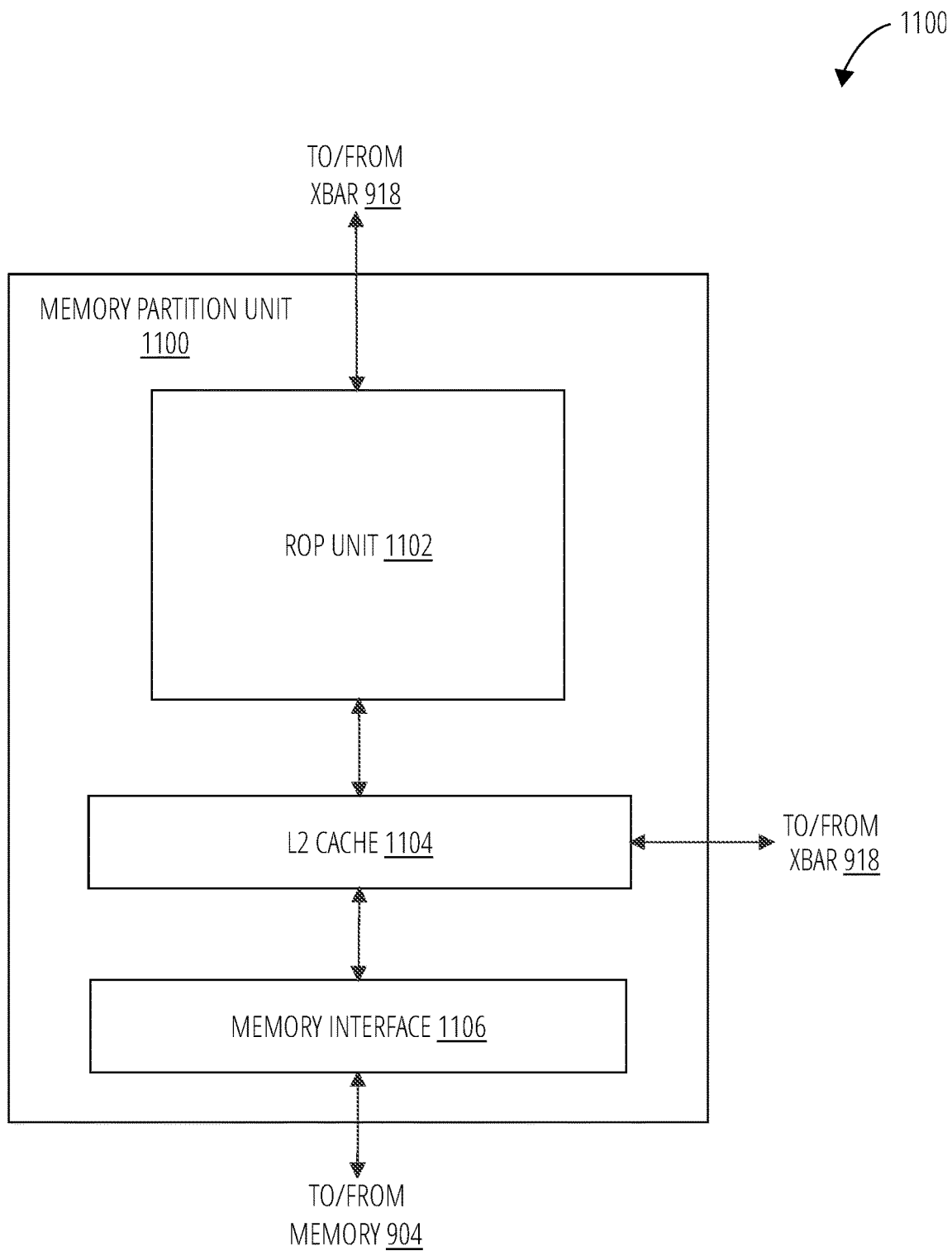
FIG. 11 depicts a memory partition unit 1100 in accordance with one embodiment.

The pre-raster operations unit 1004 is configured to route data generated by the raster engine 1008 and the data processing cluster 1006 modules to a Raster Operations (ROP) unit, described in more detail in conjunction with FIG. 11. The pre-raster operations unit 1004 may also be configured to perform optimizations for color blending, organize pixel data, perform address translations, and the like.

The raster engine 1008 includes a number of fixed function hardware units configured to perform various raster operations. In an embodiment, the raster engine 1008 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1008 comprises fragments to be processed, for example, by a fragment shader implemented within a data processing cluster 1006.

Each data processing cluster 1006 included in the general processing cluster 1000 includes an M-pipe controller 1010, a primitive engine 1012, and one or more streaming multiprocessor 1200 modules. The M-pipe controller 1010 controls the operation of the data processing cluster 1006, routing packets received from the pipeline manager 1002 to the appropriate units in the data processing cluster 1006. For example, packets associated with a vertex may be routed to the primitive engine 1012, which is configured to fetch vertex attributes associated with the vertex from the memory 904. In contrast, packets associated with a shader program may be transmitted to the streaming multiprocessor 1200.

The streaming multiprocessor 1200 comprises a programmable streaming processor that is configured to process tasks represented by a number of threads. Each streaming multiprocessor 1200 is multi-threaded and configured to execute a plurality of threads (e.g., 32 threads) from a particular group of threads concurrently. In an embodiment, the streaming multiprocessor 1200 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1200 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1200 will be described in more detail below in conjunction with FIG. 12.

The memory management unit 1016 provides an interface between the general processing cluster 1000 and the memory partition unit 1100. The memory management unit 1016 may provide translation of virtual addresses into physical addresses, memory protection, and arbitration of memory requests. In an embodiment, the memory management unit 1016 provides one or more translation lookaside buffers (TLBs) for performing translation of virtual addresses into physical addresses in the memory 904.

FIG. 11 depicts a memory partition unit 1100 of the parallel processing unit 900 of FIG. 9, in accordance with an embodiment. As shown in FIG. 11, the memory partition unit 1100 includes a raster operations unit 1102, a level two cache 1104, and a memory interface 1106. The memory interface 1106 is coupled to the memory 904. Memory interface 1106 may implement 32, 64, 128, 1024-bit data buses, or the like, for high-speed data transfer. In an embodiment, the parallel processing unit 900 incorporates U memory interface 1106 modules, one memory interface 1106 per pair of memory partition unit 1100 modules, where each pair of memory partition unit 1100 modules is connected to a corresponding memory 904 device. For example, parallel processing unit 900 may be connected to up to Y memory 904 devices, such as high bandwidth memory stacks or graphics double-data-rate, version 5, synchronous dynamic random access memory, or other types of persistent storage.

In an embodiment, the memory interface 1106 implements an HBM2 memory interface and Y equals half U. In an embodiment, the HBM2 memory stacks are located on the same physical package as the parallel processing unit 900, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 904 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 900 modules process very large datasets and/or run applications for extended periods.

In an embodiment, the parallel processing unit 900 implements a multi-level memory hierarchy. In an embodiment, the memory partition unit 1100 supports a unified memory to provide a single unified virtual address space for CPU and parallel processing unit 900 memory, enabling data sharing between virtual memory systems. In an embodiment the frequency of accesses by a parallel processing unit 900 to memory located on other processors is traced to ensure that memory pages are moved to the physical memory of the parallel processing unit 900 that is accessing the pages more frequently. In an embodiment, the NVLink 908 supports address translation services allowing the parallel processing unit 900 to directly access a CPU's page tables and providing full access to CPU memory by the parallel processing unit 900.

In an embodiment, copy engines transfer data between multiple parallel processing unit 900 modules or between parallel processing unit 900 modules and CPUs. The copy engines can generate page faults for addresses that are not mapped into the page tables. The memory partition unit 1100 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 904 or other system memory may be fetched by the memory partition unit 1100 and stored in the level two cache 1104, which is located on-chip and is shared between the various general processing cluster 1000 modules. As shown, each memory partition unit 1100 includes a portion of the level two cache 1104 associated with a corresponding memory 904 device. Lower level caches may then be implemented in various units within the general processing cluster 1000 modules. For example, each of the streaming multiprocessor 1200 modules may implement an L1 cache. The L1 cache is private memory that is dedicated to a particular streaming multiprocessor 1200. Data from the level two cache 1104 may be fetched and stored in each of the L1 caches for processing in the functional units of the streaming multiprocessor 1200 modules. The level two cache 1104 is coupled to the memory interface 1106 and the crossbar 918.

The raster operations unit 1102 performs graphics raster operations related to pixel color, such as color compression, pixel blending, and the like. The raster operations unit 1102 also implements depth testing in conjunction with the raster engine 1008, receiving a depth for a sample location associated with a pixel fragment from the culling engine of the raster engine 1008. The depth is tested against a corresponding depth in a depth buffer for a sample location associated with the fragment. If the fragment passes the depth test for the sample location, then the raster operations unit 1102 updates the depth buffer and transmits a result of the depth test to the raster engine 1008. It will be appreciated that the number of partition memory partition unit 1100 modules may be different than the number of general processing cluster 1000 modules and, therefore, each raster operations unit 1102 may be coupled to each of the general processing cluster 1000 modules. The raster operations unit 1102 tracks packets received from the different general processing cluster 1000 modules and determines which general processing cluster 1000 that a result generated by the raster operations unit 1102 is routed to through the crossbar 918. Although the raster operations unit 1102 is included within the memory partition unit 1100 in FIG. 11, in other embodiment, the raster operations unit 1102 may be outside of the memory partition unit 1100. For example, the raster operations unit 1102 may reside in the general processing cluster 1000 or another unit.

Figure 12:
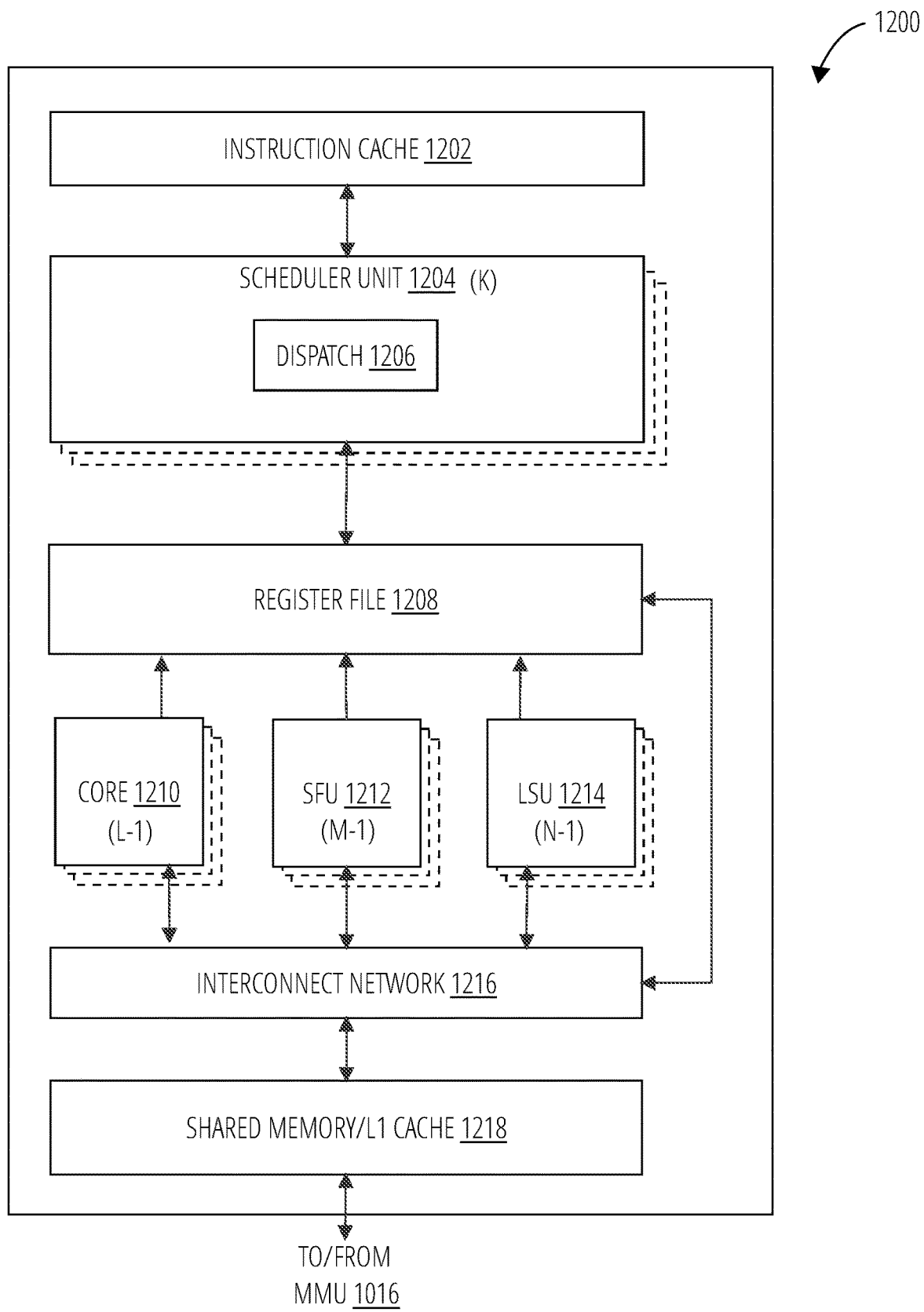
FIG. 12 depicts a streaming multiprocessor 1200 in accordance with one embodiment.

FIG. 12 illustrates the streaming multiprocessor 1200 of FIG. 10, in accordance with an embodiment. As shown in FIG. 12, the streaming multiprocessor 1200 includes an instruction cache 1202, one or more scheduler unit 1204 modules (e.g., such as scheduler unit 912), a register file 1208, one or more processing core 1210 modules, one or more special function unit 1212 modules, one or more load/store unit 1214 modules, an interconnect network 1216, and a shared memory/L1 cache 1218.

As described above, the work distribution unit 914 dispatches tasks for execution on the general processing cluster 1000 modules of the parallel processing unit 900. The tasks are allocated to a particular data processing cluster 1006 within a general processing cluster 1000 and, if the task is associated with a shader program, the task may be allocated to a streaming multiprocessor 1200. The scheduler unit 912 receives the tasks from the work distribution unit 914 and manages instruction scheduling for one or more thread blocks assigned to the streaming multiprocessor 1200. The scheduler unit 1204 schedules thread blocks for execution as warps of parallel threads, where each thread block is allocated at least one warp. In an embodiment, each warp executes 32 threads. The scheduler unit 1204 may manage a plurality of different thread blocks, allocating the warps to the different thread blocks and then dispatching instructions from the plurality of different cooperative groups to the various functional units (e.g., core 1210 modules, special function unit 1212 modules, and load/store unit 1214 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1206 unit is configured within the scheduler unit 1204 to transmit instructions to one or more of the functional units. In one embodiment, the scheduler unit 1204 includes two dispatch 1206 units that enable two different instructions from the same warp to be dispatched during each clock cycle. In alternative embodiments, each scheduler unit 1204 may include a single dispatch 1206 unit or additional dispatch 1206 units.

Each streaming multiprocessor 1200 includes a register file 1208 that provides a set of registers for the functional units of the streaming multiprocessor 1200. In an embodiment, the register file 1208 is divided between each of the functional units such that each functional unit is allocated a dedicated portion of the register file 1208. In another embodiment, the register file 1208 is divided between the different warps being executed by the streaming multiprocessor 1200. The register file 1208 provides temporary storage for operands connected to the data paths of the functional units.

Each streaming multiprocessor 1200 comprises L processing core 1210 modules. In an embodiment, the streaming multiprocessor 1200 includes a large number (e.g., 128, etc.) of distinct processing core 1210 modules. Each core 1210 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1210 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1210 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1200 also comprises M special function unit 1212 modules that perform special functions (e.g., attribute evaluation, reciprocal square root, and the like). In an embodiment, the special function unit 1212 modules may include a tree traversal unit configured to traverse a hierarchical tree data structure. In an embodiment, the special function unit 1212 modules may include texture unit configured to perform texture map filtering operations. In an embodiment, the texture units are configured to load texture maps (e.g., a 2D array of texels) from the memory 904 and sample the texture maps to produce sampled texture values for use in shader programs executed by the streaming multiprocessor 1200. In an embodiment, the texture maps are stored in the shared memory/L1 cache 1218. The texture units implement texture operations such as filtering operations using mip-maps (e.g., texture maps of varying levels of detail). In an embodiment, each streaming multiprocessor 1200 includes two texture units.

Each streaming multiprocessor 1200 also comprises N load/store unit 1214 modules that implement load and store operations between the shared memory/L1 cache 1218 and the register file 1208. Each streaming multiprocessor 1200 includes an interconnect network 1216 that connects each of the functional units to the register file 1208 and the load/store unit 1214 to the register file 1208 and shared memory/L1 cache 1218. In an embodiment, the interconnect network 1216 is a crossbar that can be configured to connect any of the functional units to any of the registers in the register file 1208 and connect the load/store unit 1214 modules to the register file 1208 and memory locations in shared memory/L1 cache 1218.

The shared memory/L1 cache 1218 is an array of on-chip memory that allows for data storage and communication between the streaming multiprocessor 1200 and the primitive engine 1012 and between threads in the streaming multiprocessor 1200. In an embodiment, the shared memory/L1 cache 1218 comprises 128 KB of storage capacity and is in the path from the streaming multiprocessor 1200 to the memory partition unit 1100. The shared memory/L1 cache 1218 can be used to cache reads and writes. One or more of the shared memory/L1 cache 1218, level two cache 1104, and memory 904 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1218 enables the shared memory/L1 cache 1218 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 9, are bypassed, creating a much simpler programming model. In the general purpose parallel computation configuration, the work distribution unit 914 assigns and distributes blocks of threads directly to the data processing cluster 1006 modules. The threads in a block execute the same program, using a unique thread ID in the calculation to ensure each thread generates unique results, using the streaming multiprocessor 1200 to execute the program and perform calculations, shared memory/L1 cache 1218 to communicate between threads, and the load/store unit 1214 to read and write global memory through the shared memory/L1 cache 1218 and the memory partition unit 1100. When configured for general purpose parallel computation, the streaming multiprocessor 1200 can also write commands that the scheduler unit 912 can use to launch new work on the data processing cluster 1006 modules.

The parallel processing unit 900 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 900 is embodied on a single semiconductor substrate. In another embodiment, the parallel processing unit 900 is included in a system-on-a-chip (SoC) along with one or more other devices such as additional parallel processing unit 900 modules, the memory 904, a reduced instruction set computer (RISC) CPU, a memory management unit (MMU), a digital-to-analog converter (DAC), and the like.

In an embodiment, the parallel processing unit 900 may be included on a graphics card that includes one or more memory devices. The graphics card may be configured to interface with a PCIe slot on a motherboard of a desktop computer. In yet another embodiment, the parallel processing unit 900 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13:
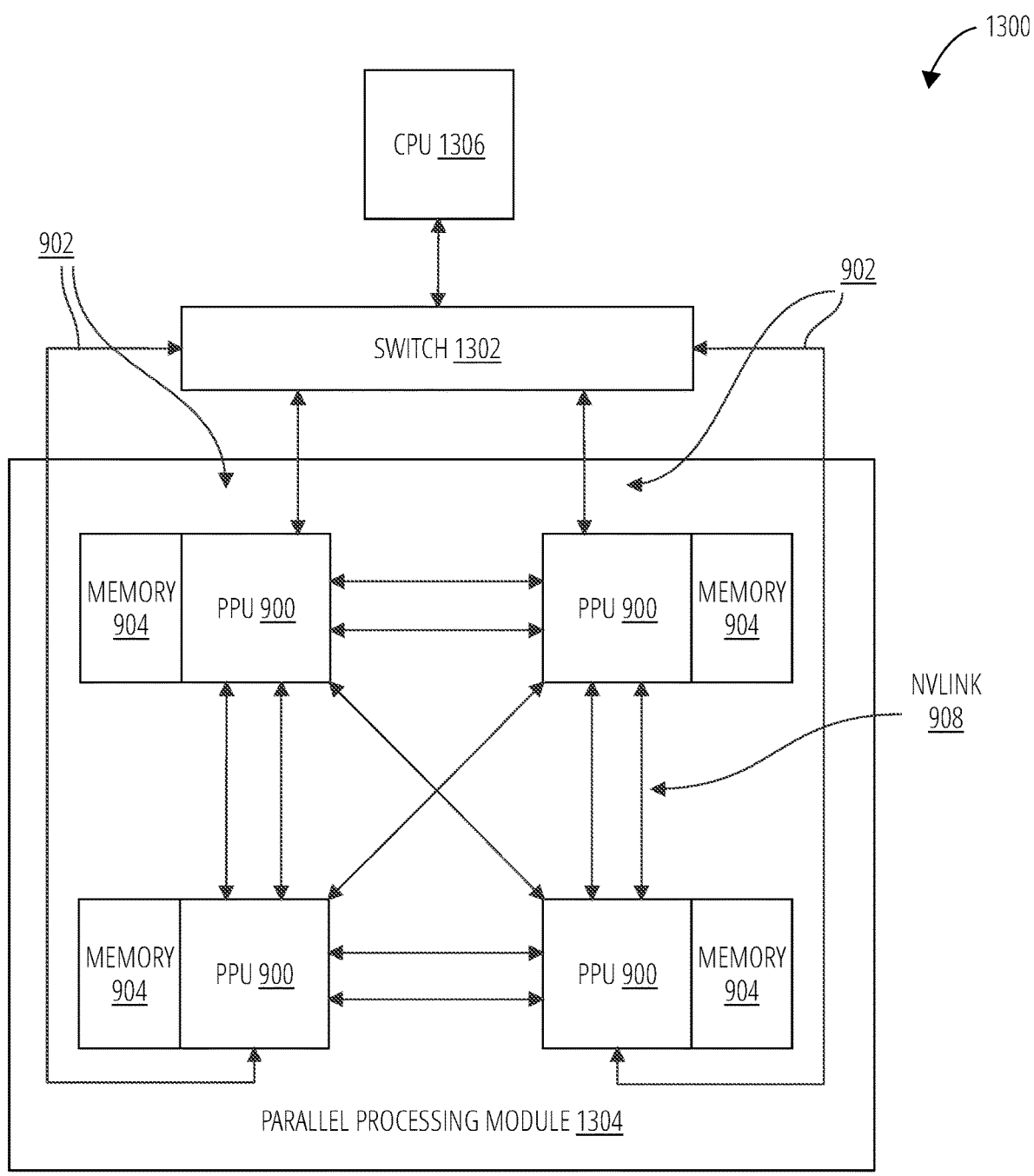
FIG. 13 depicts a processing system 1300 in accordance with one embodiment.

FIG. 13 is a conceptual diagram of a processing system 1300 implemented using the parallel processing unit 900 of FIG. 9, in accordance with an embodiment. The processing system 1300 includes a central processing unit 1306, switch 1302, and multiple parallel processing unit 900 modules each and respective memory 904 modules. The NVLink 908 provides high-speed communication links between each of the parallel processing unit 900 modules. Although a particular number of NVLink 908 and interconnect 902 connections are illustrated in FIG. 13, the number of connections to each parallel processing unit 900 and the central processing unit 1306 may vary. The switch 1302 interfaces between the interconnect 902 and the central processing unit 1306. The parallel processing unit 900 modules, memory 904 modules, and NVLink 908 connections may be situated on a single semiconductor platform to form a parallel processing module 1304. In an embodiment, the switch 1302 supports two or more protocols to interface between various different connections and/or links.

In another embodiment (not shown), the NVLink 908 provides one or more high-speed communication links between each of the parallel processing unit 900 modules and the central processing unit 1306 and the switch 1302 interfaces between the interconnect 902 and each of the parallel processing unit 900 modules. The parallel processing unit 900 modules, memory 904 modules, and interconnect 902 may be situated on a single semiconductor platform to form a parallel processing module 1304. In yet another embodiment (not shown), the interconnect 902 provides one or more communication links between each of the parallel processing unit 900 modules and the central processing unit 1306 and the switch 1302 interfaces between each of the parallel processing unit 900 modules using the NVLink 908 to provide one or more high-speed communication links between the parallel processing unit 900 modules. In another embodiment (not shown), the NVLink 908 provides one or more high-speed communication links between the parallel processing unit 900 modules and the central processing unit 1306 through the switch 1302. In yet another embodiment (not shown), the interconnect 902 provides one or more communication links between each of the parallel processing unit 900 modules directly. One or more of the NVLink 908 high-speed communication links may be implemented as a physical NVLink interconnect or either an on-chip or on-die interconnect using the same protocol as the NVLink 908.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1304 may be implemented as a circuit board substrate and each of the parallel processing unit 900 modules and/or memory 904 modules may be packaged devices. In an embodiment, the central processing unit 1306, switch 1302, and the parallel processing module 1304 are situated on a single semiconductor platform.

In an embodiment, the signaling rate of each NVLink 908 is 20 to 25 Gigabits/second and each parallel processing unit 900 includes six NVLink 908 interfaces (as shown in FIG. 13, five NVLink 908 interfaces are included for each parallel processing unit 900). Each NVLink 908 provides a data transfer rate of 25 Gigabytes/second in each direction, with six links providing 300 Gigabytes/second. The NVLink 908 can be used exclusively for PPU-to-PPU communication as shown in FIG. 13, or some combination of PPU-to-PPU and PPU-to-CPU, when the central processing unit 1306 also includes one or more NVLink 908 interfaces.

In an embodiment, the NVLink 908 allows direct load/store/atomic access from the central processing unit 1306 to each parallel processing unit 900 module's memory 904. In an embodiment, the NVLink 908 supports coherency operations, allowing data read from the memory 904 modules to be stored in the cache hierarchy of the central processing unit 1306, reducing cache access latency for the central processing unit 1306. In an embodiment, the NVLink 908 includes support for Address Translation Services (ATS), allowing the parallel processing unit 900 to directly access page tables within the central processing unit 1306. One or more of the NVLink 908 may also be configured to operate in a low-power mode.

Figure 14:
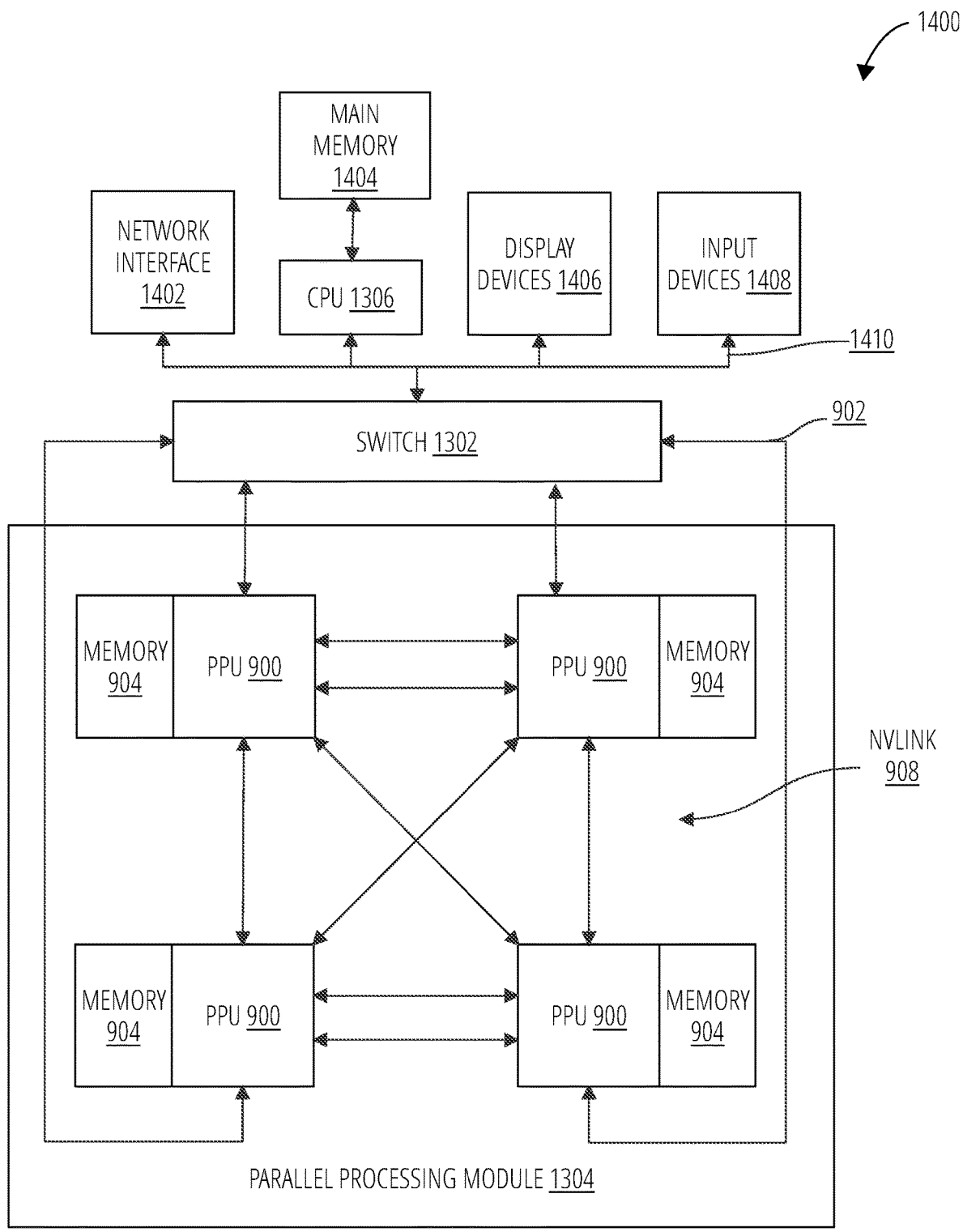
FIG. 14 depicts an exemplary processing system 1400 in accordance with another embodiment.

FIG. 14 depicts an exemplary processing system 1400 in which the various architecture and/or functionality of the various previous embodiments may be implemented. As shown, an exemplary processing system 1400 is provided including at least one central processing unit 1306 that is connected to a communications bus 1410. The communication communications bus 1410 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1400 also includes a main memory 1404. Control logic (software) and data are stored in the main memory 1404 which may take the form of random access memory (RAM).

The exemplary processing system 1400 also includes input devices 1408, the parallel processing module 1304, and display devices 1406, e.g. a conventional CRT (cathode ray tube), LCD (liquid crystal display), LED (light emitting diode), plasma display or the like. User input may be received from the input devices 1408, e.g., keyboard, mouse, touchpad, microphone, and the like. Each of the foregoing modules and/or devices may even be situated on a single semiconductor platform to form the exemplary processing system 1400. Alternately, the various modules may also be situated separately or in various combinations of semiconductor platforms per the desires of the user.

Further, the exemplary processing system 1400 may be coupled to a network (e.g., a telecommunications network, local area network (LAN), wireless network, wide area network (WAN) such as the Internet, peer-to-peer network, cable network, or the like) through a network interface 1402 for communication purposes.

The exemplary processing system 1400 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1404 and/or the secondary storage. Such computer programs, when executed, enable the exemplary processing system 1400 to perform various functions. The main memory 1404, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1400 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 14 is a conceptual diagram of a graphics processing pipeline 1500 implemented by the parallel processing unit 900 of FIG. 9, in accordance with an embodiment. In an embodiment, the parallel processing unit 900 comprises a graphics processing unit (GPU). The parallel processing unit 900 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 900 can be configured to process the graphics primitives to generate a frame buffer (e.g., pixel data for each of the pixels of the display).

An application writes model data for a scene (e.g., a collection of vertices and attributes) to a memory such as a system memory or memory 904. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1200 modules of the parallel processing unit 900 including one or more of a vertex shader, hull shader, domain shader, geometry shader, and a pixel shader. For example, one or more of the streaming multiprocessor 1200 modules may be configured to execute a vertex shader program that processes a number of vertices defined by the model data. In an embodiment, the different streaming multiprocessor 1200 modules may be configured to execute different shader programs concurrently. For example, a first subset of streaming multiprocessor 1200 modules may be configured to execute a vertex shader program while a second subset of streaming multiprocessor 1200 modules may be configured to execute a pixel shader program. The first subset of streaming multiprocessor 1200 modules processes vertex data to produce processed vertex data and writes the processed vertex data to the level two cache 1104 and/or the memory 904. After the processed vertex data is rasterized (e.g., transformed from three-dimensional data into two-dimensional data in screen space) to produce fragment data, the second subset of streaming multiprocessor 1200 modules executes a pixel shader to produce processed fragment data, which is then blended with other processed fragment data and written to the frame buffer in memory 904. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1500 receives input data 601 that is transmitted from one stage to the next stage of the graphics processing pipeline 1500 to generate output data 1504. In an embodiment, the graphics processing pipeline 1500 may represent a graphics processing pipeline defined by the OpenGL® API. As an option, the graphics processing pipeline 1500 may be implemented in the context of the functionality and architecture of the previous Figures and/or any subsequent Figure(s).

Figure 15:
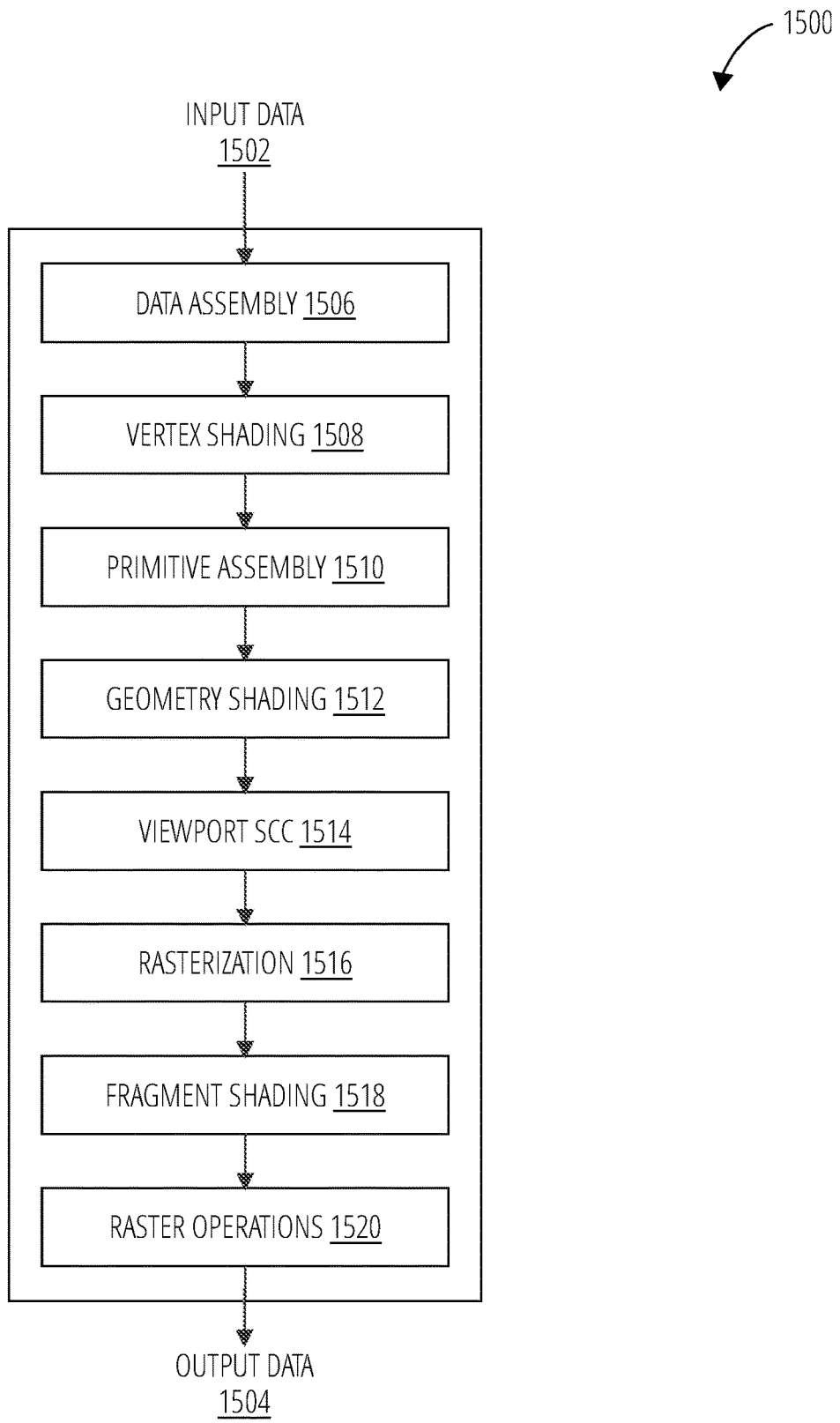
FIG. 15 depicts a graphics processing pipeline 1500 in accordance with one embodiment.

As shown in FIG. 15, the graphics processing pipeline 1500 comprises a pipeline architecture that includes a number of stages. The stages include, but are not limited to, a data assembly 1506 stage, a vertex shading 1508 stage, a primitive assembly 1510 stage, a geometry shading 1512 stage, a viewport SCC 1514 stage, a rasterization 1516 stage, a fragment shading 1518 stage, and a raster operations 1520 stage. In an embodiment, the input data 1502 comprises commands that configure the processing units to implement the stages of the graphics processing pipeline 1500 and geometric primitives (e.g., points, lines, triangles, quads, triangle strips or fans, etc.) to be processed by the stages. The output data 1504 may comprise pixel data (e.g., color data) that is copied into a frame buffer or other type of surface data structure in a memory.

The data assembly 1506 stage receives the input data 1502 that specifies vertex data for high-order surfaces, primitives, or the like. The data assembly 1506 stage collects the vertex data in a temporary storage or queue, such as by receiving a command from the host processor that includes a pointer to a buffer in memory and reading the vertex data from the buffer. The vertex data is then transmitted to the vertex shading 1508 stage for processing.

The vertex shading 1508 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1508 stage may manipulate individual vertex attributes such as position, color, texture coordinates, and the like. In other words, the vertex shading 1508 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1508 stage generates transformed vertex data that is transmitted to the primitive assembly 1510 stage.

The primitive assembly 1510 stage collects vertices output by the vertex shading 1508 stage and groups the vertices into geometric primitives for processing by the geometry shading 1512 stage. For example, the primitive assembly 1510 stage may be configured to group every three consecutive vertices as a geometric primitive (e.g., a triangle) for transmission to the geometry shading 1512 stage. In some embodiments, specific vertices may be reused for consecutive geometric primitives (e.g., two consecutive triangles in a triangle strip may share two vertices). The primitive assembly 1510 stage transmits geometric primitives (e.g., a collection of associated vertices) to the geometry shading 1512 stage.

The geometry shading 1512 stage processes geometric primitives by performing a set of operations (e.g., a geometry shader or program) on the geometric primitives. Tessellation operations may generate one or more geometric primitives from each geometric primitive. In other words, the geometry shading 1512 stage may subdivide each geometric primitive into a finer mesh of two or more geometric primitives for processing by the rest of the graphics processing pipeline 1500. The geometry shading 1512 stage transmits geometric primitives to the viewport SCC 1514 stage.

In an embodiment, the graphics processing pipeline 1500 may operate within a streaming multiprocessor and the vertex shading 1508 stage, the primitive assembly 1510 stage, the geometry shading 1512 stage, the fragment shading 1518 stage, and/or hardware/software associated therewith, may sequentially perform processing operations. Once the sequential processing operations are complete, in an embodiment, the viewport SCC 1514 stage may utilize the data. In an embodiment, primitive data processed by one or more of the stages in the graphics processing pipeline 1500 may be written to a cache (e.g. L1 cache, a vertex cache, etc.). In this case, in an embodiment, the viewport SCC 1514 stage may access the data in the cache. In an embodiment, the viewport SCC 1514 stage and the rasterization 1516 stage are implemented as fixed function circuitry.

The viewport SCC 1514 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1516 stage.

The rasterization 1516 stage converts the 3D geometric primitives into 2D fragments (e.g. capable of being utilized for display, etc.). The rasterization 1516 stage may be configured to utilize the vertices of the geometric primitives to setup a set of plane equations from which various attributes can be interpolated. The rasterization 1516 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1516 stage generates fragment data (e.g., interpolated vertex attributes associated with a particular sample location for each covered pixel) that are transmitted to the fragment shading 1518 stage.

The fragment shading 1518 stage processes fragment data by performing a set of operations (e.g., a fragment shader or a program) on each of the fragments. The fragment shading 1518 stage may generate pixel data (e.g., color values) for the fragment such as by performing lighting operations or sampling texture maps using interpolated texture coordinates for the fragment. The fragment shading 1518 stage generates pixel data that is transmitted to the raster operations 1520 stage.

The raster operations 1520 stage may perform various operations on the pixel data such as performing alpha tests, stencil tests, and blending the pixel data with other pixel data corresponding to other fragments associated with the pixel. When the raster operations 1520 stage has finished processing the pixel data (e.g., the output data 1504), the pixel data may be written to a render target such as a frame buffer, a color buffer, or the like.

It will be appreciated that one or more additional stages may be included in the graphics processing pipeline 1500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1512 stage). Other types of graphics processing pipelines are contemplated as being within the scope of the present disclosure. Furthermore, any of the stages of the graphics processing pipeline 1500 may be implemented by one or more dedicated hardware units within a graphics processor such as parallel processing unit 900. Other stages of the graphics processing pipeline 1500 may be implemented by programmable hardware units such as the streaming multiprocessor 1200 of the parallel processing unit 900.

The graphics processing pipeline 1500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 900. The API provides an abstraction for a programmer that lets a programmer utilize specialized graphics hardware, such as the parallel processing unit 900, to generate the graphical data without requiring the programmer to utilize the specific instruction set for the parallel processing unit 900. The application may include an API call that is routed to the device driver for the parallel processing unit 900. The device driver interprets the API call and performs various operations to respond to the API call. In some instances, the device driver may perform operations by executing instructions on the CPU. In other instances, the device driver may perform operations, at least in part, by launching operations on the parallel processing unit 900 utilizing an input/output interface between the CPU and the parallel processing unit 900. In an embodiment, the device driver is configured to implement the graphics processing pipeline 1500 utilizing the hardware of the parallel processing unit 900.

Various programs may be executed within the parallel processing unit 900 in order to implement the various stages of the graphics processing pipeline 1500. For example, the device driver may launch a kernel on the parallel processing unit 900 to perform the vertex shading 1508 stage on one streaming multiprocessor 1200 (or multiple streaming multiprocessor 1200 modules). The device driver (or the initial kernel executed by the parallel processing unit 900) may also launch other kernels on the parallel processing unit 900 to perform other stages of the graphics processing pipeline 1500, such as the geometry shading 1512 stage and the fragment shading 1518 stage. In addition, some of the stages of the graphics processing pipeline 1500 may be implemented on fixed unit hardware such as a rasterizer or a data assembler implemented within the parallel processing unit 900. It will be appreciated that results from one kernel may be processed by one or more intervening fixed function hardware units before being processed by a subsequent kernel on a streaming multiprocessor 1200.

Code Listing

The following Matlab code illustrates an exemplary embodiment of an algorithm for generating a codebook in accordance with the techniques disclosed herein. Certain functions and operations are not elaborated in detail as their implementation would be evident to one of ordinary skill in the art without undue experimentation.

```
function obj = findDwords9(Cobj, ptr, ord_list, x_in, y_out,
target)
if(nargin < 6)
target =2;
end
% Algorithm Overview
% 1) Find all HDy(1) words w.r.t y_lcv (y_lcv un-assigned)
% 2) Search for x-word to pair w/ y_lcv code word
%      (a) find all possible HDx1 and then HDx2 words
%      (b) criteria would be word needs to fit w/ in already
mapped HDy1 words
%      (c) choose word that matches, becomes harder w/ less
% 3) Recursive call to function w/ next un-used code word in HDy1
words; base case --> Assigned all data words (128)
if(isempty(Cobj))
    disp('breaking, empty object case');
    obj = ' ';
    return;
end
if(length(getDwords(Cobj))>size(x_in,1))
    disp('Base Case - - - - - - - - - - - - - - - - - - - - - - - - - - - - - - -');
    x_inds = getDwords(Cobj);
    y_inds = getCwords(Cobj);
    xy = getCwordsHD(x_in(x_inds,:),y_out(y_inds,:));
    if(xy.max <= target)
        xy. max
```

-continued

```
        x_inds
        y_inds
        disp('Met Target HD');
        obj = Cobj;
        fid =
fopen(strcat('filename',num2str(round(rand(1)*10000)),'.txt'),'a+')
;
        fprintf(fid,'%s\n',strcat('Max HD = ',num2str(xy.max),'
Code Word Sequence: ',num2str(y_inds)));
        fclose(fid);
    else
        obj = ' ';
    end
    return;
end
if(ptr<=length(ord_list))
    ind = ord_list(ptr);
else
    disp(' Reached end of valid Cwords Fail');
    obj = ' ';
    return;
end
% Get already mapped words
x_inds = getDwords(Cobj);
y_inds = getCwords(Cobj);
% free data words
xio = setdiff(1:size(x_in,1),x_inds);
c_inds = findMinHDx(ind,setxor(ind,1:size(y_out,1)),y_out,1);
% see if there are any requirements to match existing d-words
c_exist =intersect(y_inds,c_inds);
% list of all un-mapped dwords = xio
d_inds = xio;
% try to find all related HDxtarget of pre-mapped words; find
HDx=2 w.r.t existing mapped Dwords and XOR w/ mapped words
new_dwords =
setxor(findMinHDxMult(x_inds,1:size(x_in,1),x_in,target),x_inds);
% check to see if there are existing code words we need to look at
for mapping
if(~isempty(c_exist))
    % filter valid coefficients based on existing d-word mapping
    temp = [ ];
    for z=1:length(c_exist)
        % if first node to check, create new temp vector
        if(~isempty(temp))
            temp =
intersect(temp,findMinHDx(x_inds(y_inds==c_exist(z)),xio,x_in,targe
t));
        elseif(z==1)
            % build restrictions since we already have temp vec
            temp =
findMinHDx(x_inds(y_inds==c_exist(z)),xio,x_in,target);
        end
    end
    % set of valid dwords is intersection of restriction and un-
mapped
    d_inds =intersect(d_inds,temp);
else
    % no restrictions; try choosing furthest spaced away words (no
HD-target mappings)
    disp('no previous words');
    if(~isempty(new_dwords))
        d_inds =new_dwords;
    end
end
if(isempty(d_inds))
    % try back-propagating to see if previous nodes can be
refigured
    obj =
backPropagateDwords(Cobj,ptr,ord_list,xio,x_in,y_out,target);
    %for z=1:inds
        % see if previous words can use different dword w/o
breaking HD
        if(isempty(obj))
            obj = findDwords9(Cobj,ptr+1,ord_list,x_in,y_out,target);
        end
        return;
    end
% Now add each possible d-word to tree and fork out to recursive
call
```

```
for z=1:length(d_inds)
   Ctemp = addNode(d_inds(z),ind,0,Cobj);
   xy =
getCwordsHD(x_in(getDwords(Ctemp),:),y_out(getCwords(Ctemp),:));
   if(xy.max > target)
      disp('MAX XY Delta Violated');
      obj = findDwords9(' ',ptr,ord_list,x_in,y_out);
      return;
   end
   ctemp = getCwords(Ctemp);
   if ((ptr == length(ord_list))| | ((ptr <length(ord_list)) &&
(~ismember(ord_list(ptr+1),ctemp))))
      if(length(ctemp) == 128)
         disp('Done');
         [getDwords(Ctemp)' getCwords(Ctemp)']
         disp('done');
      else
         obj =
findDwords9(Ctemp,ptr+1,ord_list,x_in,y_out,target);
      end
   else
      obj = findDwords9(' ',ptr,ord_list,x_in,y_out,target);
      return;
   end
 end
end
function obj = swapCword(Cobj,y_old,x_new)
obj = removeObj(Cobj,y_old);
obj = addNode(x_new,y_old,0,obj);
return;
function xy = getSwappable(Ct,x_in,y_out,target)
% finds nodes that can be swapped out still meeting HDx=2 w/ unused
d-words
y_u = getCwords(Ct);
x_u = getDwords(Ct);
y_a = setdiff(1:size(y_out,1),y_u);
x_a = setdiff(1:size(x_in,1),x_u);
xY = [ ];
   % iterate over C-words
for zz=1:length(y_u)
   % find HDy=1 assigned
   ind = y_u(zz);
      %find the words HDy<=1 to current word
   c_inds = findMinHDx(ind,setxor(ind,1:size(y_out,1)),y_out,1);
   c_exist = intersect(y_u,c_inds);
   temp = [ ];
   for z=1:length(c_exist)
      % if first node to check, create new temp vector
      ind1 = c_exist(z);
      if(~isempty(temp))
         temp =
intersect(temp,findMinHDx(x_u(y_u==ind1),x_a,x_in,target));
      elseif(z==1)
         temp = findMinHDx(x_u(y_u==ind1),x_a,x_in,target);
      end
   end
   % set of valid dwords is intersection of restriction and un-
mapped
   if(~isempty(temp))
      xy = [xy; temp id];
   end
end
```

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
    generating a first codebook by assigning codewords to data words, wherein:
        each codeword that is assigned has a Hamming Distance (HD) of one with respect to a data word to which the codeword is assigned;
        the data word to which the codeword is assigned has a Hamming Distance less than or equal to two with respect to data words already having codewords assigned; and
    utilizing the first codebook to encode data for transmission on a data bus.

2. The method of claim 1, wherein:
    utilizing the first codebook to encode the data words into the codewords after a cyclic redundancy check (CRC) value is computed on the data words; and
    the cyclic redundancy check value is transmitted in association with the encoded data on the data bus.

3. The method of claim 1, further comprising:
    forming a first set of the data words satisfying HD(x, y)≤2 for an unassigned codeword; and
    sorting the first set of data words such that data words satisfying HD(x, y)=1 have a higher priority for assignment of a codeword;
    wherein HD(x) is a data-word-to-decoded-codeword Hamming Distance, HD(y) is a codeword-to-channel-error Hamming Distance, and HD(x,y) is a data-word-to-code-word Hamming Distance.

4. The method of claim 3, further comprising:
    forming a second set of data words satisfying HD(x)≤2 with respect to one another; and
    determining an intersection set of the first set of data words and the second set of data words.

5. The method of claim 4, further comprising:
    determining an unassigned codeword from the intersection set that satisfies HD(y)=1 for data words in the intersection set subject to a constraint that a data word to assign to the codeword satisfies HD(x)<=2 with respect to data words that are already assigned to codewords.

6. The method of claim 1, further comprising:
    inverting the first codebook to generate a second codebook to encode the data for transmission on a data bus.

7. The method of claim 1, further comprising:
    determining if an inversion of a most significant bit (MSB) of a transmitted codeword has occurred; and
    on condition that the MSB inversion has occurred, retransmitting the transmitted codeword.

8. The method of claim 7, wherein determining if the MSB inversion occurred comprises comparing a cyclic redundancy check (CRC) for the transmitted data word generated before transmission with a CRC for the transmitted data word generated after decoding.

9. A system comprising:
    a first digital component;
    a second digital component coupled to the first digital component via a data bus; and
    an encoder utilizing a first codebook generated by assigning codewords to data words communicated between the first digital component and the second digital component over the bus, each codeword that is assigned having a Hamming Distance (HD) of one with respect to an assigned data word for the codeword; and
    wherein each of the data words has a Hamming Distance less than or equal to two relative to other data words to which codewords are assigned.

10. The system of claim 9, further comprising:
    the encoder disposed between a cyclic redundancy check (CRC) generator and the bus, such that the first codebook is utilized by the encoder to encode the data words into the codewords after a cyclic redundancy check value is computed on the data words by the CRC generator.

11. The system of claim 9, the first codebook generated by further:
    forming a first set of the data words satisfying HD(x, y)≤2 for an unassigned codeword; and
    sorting the first set of data words such that data words satisfying HD(x, y)=1 have a higher priority for assignment of a codeword;
    wherein HD(x) is a data-word-to-decoded-codeword Hamming Distance, HD(y) is a codeword-to-channel-error Hamming Distance, and HD(x,y) is a data-word-to-code-word Hamming Distance.

12. The system of claim 11, the first codebook generated by further:
    forming a second set of data words satisfying HD(x)≤2 with respect to one another; and
    determining an intersection set of the first set of data words and the second set of data words.

13. The system of claim 12, the first codebook generated by further:
    determining an unassigned codeword from the intersection set that satisfies HD(y)=1 for data words in the intersection set subject to a constraint that a data word to assign to the codeword satisfies HD(x)<=2 with respect to data words that are already assigned to codewords.

14. The system of claim 9, further comprising:
    a second codebook utilized by the encoder to encode the data words into the code words, the second codebook generated by inverting the first codebook.

15. The system of claim 9, the encoder configured to determine if an inversion of a most significant bit (MSB) of a transmitted codeword has occurred; and
    on condition that an MSB inversion has occurred, initiate a retransmission of the transmitted codeword over the bus.

16. The system of claim 15, wherein the encoder determining if the MSB inversion occurred comprises comparing a cyclic redundancy check (CRC) for the transmitted data word generated before transmission with a CRC generated on the data word after decoding.

17. The system of claim 15, wherein the first digital component and second digital component comprise a memory and a processor.

18. The system of claim 15, wherein the first digital component and second digital component comprise a first processor and a second processor.

19. The system of claim 15, wherein the first digital component and second digital component comprise a first memory and a second memory.

* * * * *